March 31, 1953        G. HANSEN        2,633,053

REFRACTOMETER WITH PLURALITY OF SCALES

Filed Nov. 15, 1950

Inventor:

Gerhard Hansen.

UNITED STATES PATENT OFFICE 2,633,053

REFRACTOMETER WITH PLURALITY OF SCALES

Gerhard Hansen, Heidenheim, Germany, assignor to Zeiss-Opton Optische Werke Oberkochen G. m. b. H., Oberkochen, Wurttemberg, Germany Application November 15, 1950, Serial No. 195,767
In Germany November 21, 1949

4 Claims. (Cl. 88—14)

The invention refers to a refractometer based on the principle of total refraction, whose total range of measurement is split up into subranges by deflecting prisms, these subranges being inspected in the field of view of an observation telescope, with several scales lying side by side. The border line of total reflection then appears, according to the refractive power of the sample substance under examination, upon one of the scales. One has undertaken this splitting up of the measuring range in consideration of the small field of view of the observation telescopes, which usually does not suffice to embrace the total range of measurement in a single scale of corresponding length. For observing the individual scales it is known to provide separate telescopes for observing each scale. In another known arrangement the prism, effecting such splitting of the total measuring range into subranges, is arranged swingable, and then for the moment illuminates only one of the respective scales. In both arrangements the respective individual subranges of the total measuring range can only be viewed one after another.

It is now frequently desirable for allowing a more rapid survey over the total measuring range to follow up all subranges at once in the field of view. In accordance with the invention this is attained in a refractometer of the described kind with several scales by providing a diaphragm with openings, equal in number with the number of scales, said diaphragm being placed in the entrance pupil of the telescope, and one or several prisms being provided in front of the scale carrier by means of which each diaphragm opening is caused to cooperate with a particular scale. The refracting angles of the prisms at the scale carrier are preferably so selected that all of the diaphragm openings are imaged one upon another in the exit pupil of the observation telescope. Then the observer, whose eye is located in the exit pupil, sees in fact all scales simultaneously and can at first sight ascertain upon which scale the border line of total reflection is located. For facilitating the observation, a diaphragm is placed in the exit pupil, so that those disturbing side images of the other diaphragm openings which are likewise produced upon imaging through the inclined surfaces of the scale carrier prisms, are made invisible.

Figure 1:
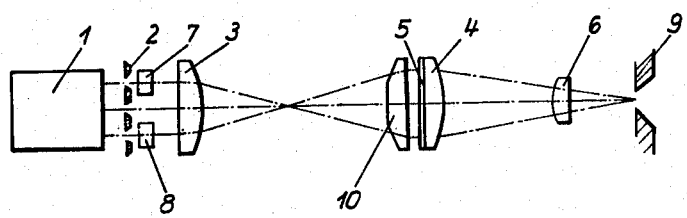
Figure 2:
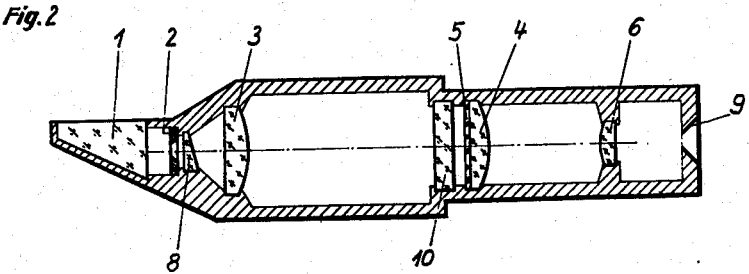
Figure 3:
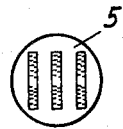

For closer elucidation of the invention an example in accordance therewith is represented schematically in the accompanying drawing, of which Fig. 1 shows the optical structure of a refractometer in top plan view and Fig. 2 the same instrument in side view and in section. Fig. 3 finally represents a scale plate.

In the represented refractometer the measuring range is split up into three subranges. A diaphragm 2 with three slit shaped openings (cf. Fig. 1) is provided behind the totally reflecting prism 1 in the entrance pupil of the observation telescope. The light rays going through the middle opening pass unhindered through a telescope objective 3 and a field lens 4 associated with a scale plate 5 into an ocular 6. The rays which go through the two outer diaphragm openings are so deflected by prisms 7 and 8 that the two outer subranges lie in the scale plane 5 side by side the middle subrange. Accordingly the plate 5, as Fig. 3 shows, is provided with three scales lying side by side, of which each spans a portion of the measuring range. The objective and the ocular produce an image of the diaphragm 2 in the exit pupil, at which a diaphragm 9 with a single opening is provided. In order that each of the three openings in diaphragm 2 is alloted to only one of the scales a further prism 10 is placed before the scale carrier, the middle part of which prism lies before the middle scale (Fig. 3) and causes no ray deflection. The two outer parts of the prism 10 on the other hand deflect the light so that the images of the diaphragm openings lying in front of the prisms 7 and 8 likewise lie in the exit pupil in the optical axis of the telescope. The respective images formed of the two other openings by the inclined surfaces of prism 10 do not disturb the observer because they are masked with the apertured diaphragm 9.

The field of view presenting itself to the observer appears in Fig. 3. The entire field except the scales is dark and the border line of total reflection then shows itself in one of the three scales.

The embodiment described above can however also be varied. The prism 10 e. g. can also be built up of elementary prisms and the prisms 7 and 8 under circumstances can be directly united with the totally refracting prism 1 or may be part of this prism. Besides it is possible to also employ other means than prisms, e. g. mirrors, for deflecting the rays in splitting up of the measuring range. It is solely necessary to allot to each of the beams a diaphragm opening in the entrance pupil. Naturally also a different number of scales can be employed. In many cases two scales will suffice.

I claim:

1. A refractometer with the total measuring range split up into a series of sub-ranges, comprising in a housing a refractometer prism mounted at the one end of said housing, an observation telescope system consisting of an objective lens, an ocular lens and a field lens between them, a series of laterally spaced scales of consecutive values equal in number to said sub-ranges and disposed in the vicinity of said field lens, a diaphragm disposed in the entrance pupil plane of said telescope system and having a number of laterally spaced openings corresponding to the number of said sub-ranges, and refracting means disposed in operative relation to and between said scales and said openings and having different refracting angles for splitting the total range of refracted rays passing therethrough into said series of sub-ranges of consecutive sample index values corresponding to the scale values, and further refracting means disposed between said objective lens and said scales and for directing said split-up rays towards the corresponding scales.

2. In a refractometer according to claim 1 said further refracting means comprising prisms having different refracting angles and being adapted for deflecting the rays from said laterally displaced diaphragm openings through said scales back towards the optic axis into the exit pupil plane of said telescope system beyond said ocular lens.

3. In a refractometer according to claim 1 said further refracting means comprising prisms having different refracting angles and being adapted for deflecting the rays from said laterally displaced diaphragm openings through said scales back towards the optic axis into the exit pupil plane of said telescope system, and a fixed hole diaphragm disposed in the said exit pupil of said system beyond said ocular lens.

4. In a refractometer according to claim 1 said refracting means for splitting up the total range of refracted rays being disposed between said diaphragm openings and said telescope objective lens.

GERHARD HANSEN.

REFERENCES CITED

The following references are of record in the file of this patent:

UNITED STATES PATENTS

| Number | Name | Date |
|---|---|---|
| 2,383,347 | Silge | Aug. 21, 1945 |